United States Patent Office 3,833,503
Patented Sept. 3, 1974

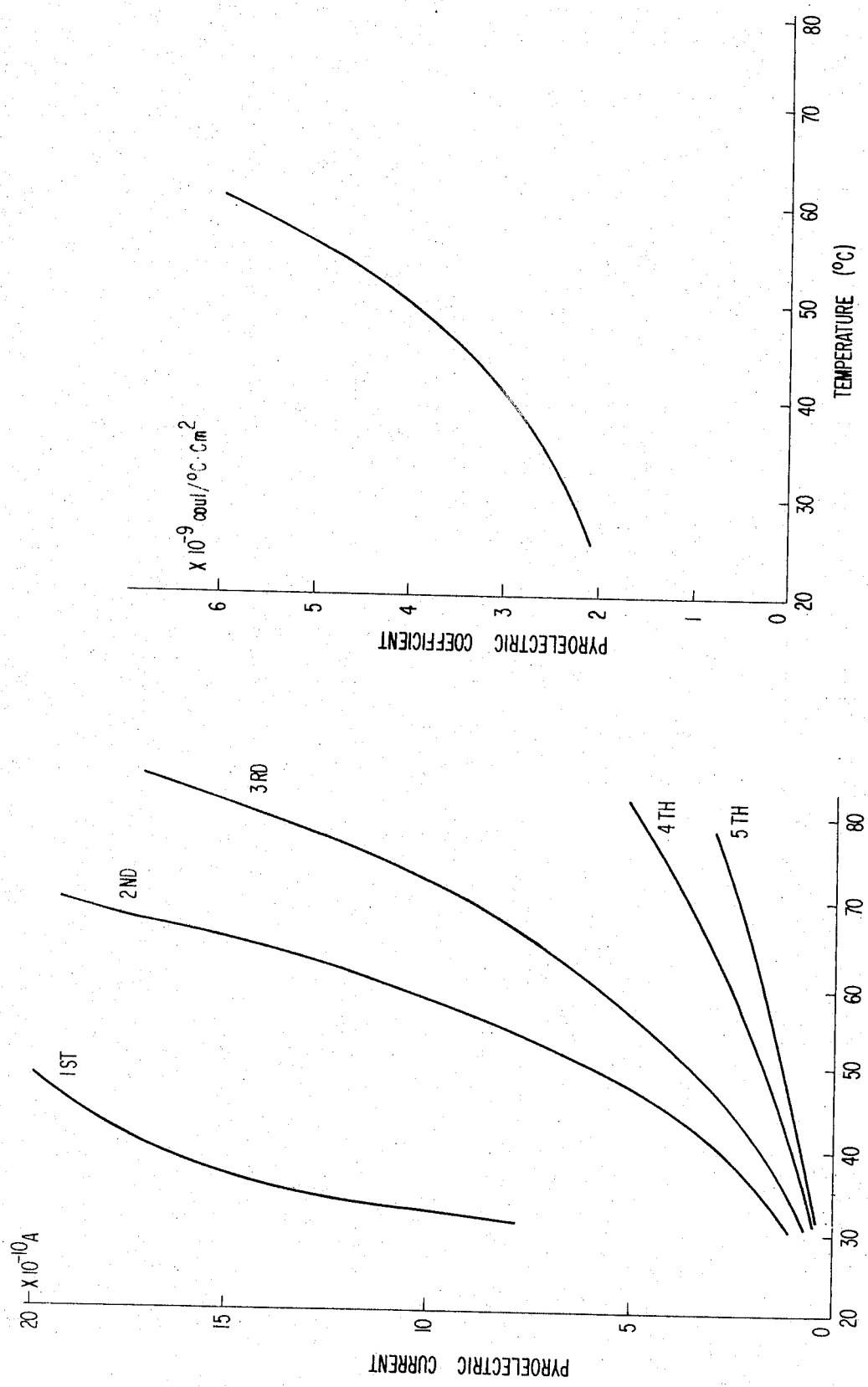

3,833,503
STABLE PYROELECTRIC ELEMENTS
Naohiro Murayama and Hideyuki Hashizume, Iwaki, Japan, assignors to Kureha Kagaku Kogyo Kabushiki Kaisha, Tokyo, Japan
Filed Feb. 9, 1972, Ser. No. 224,910
Claims priority, application Japan, Feb. 9, 1971, 46/5,008
Int. Cl. H01b 3/18
U.S. Cl. 252—63.7                7 Claims

ABSTRACT OF THE DISCLOSURE

The stable pyroelectric element composed of a vinylidene fluoride resin electret of which the macroscopic polarization due to space charges have been depolarized.

DISCLOSURE OF THE INVENTION

Figure 2:
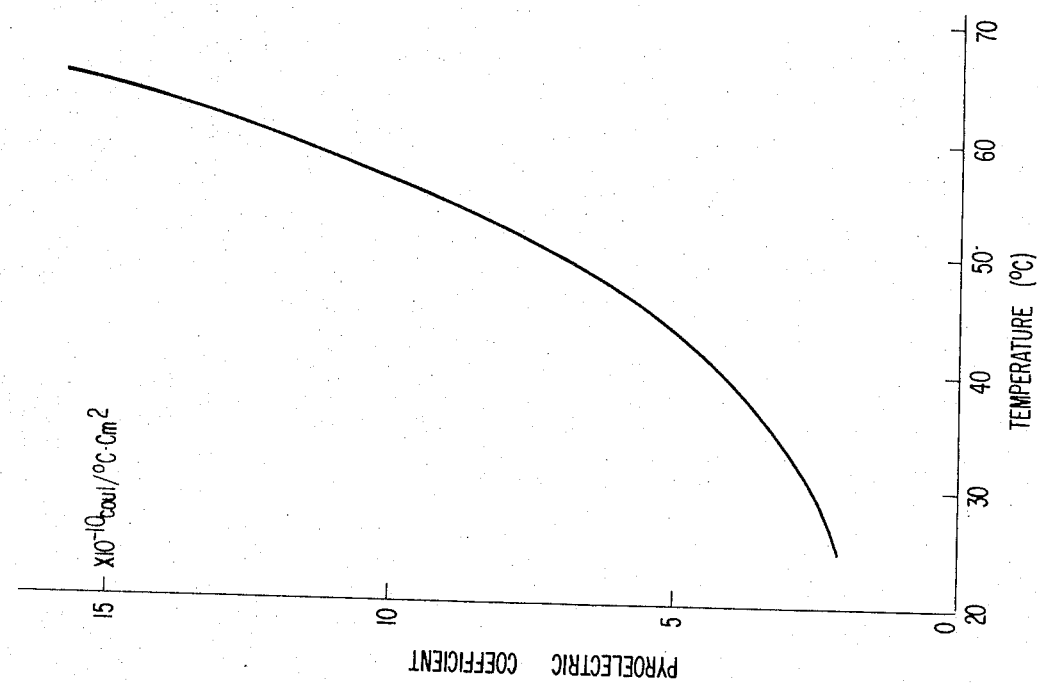

The present invention relates to a stable pyroelectric element composed of a vinylidene fluoride resin composition.

A phenomenon that the polarization of a dielectric substance varies by the variation of temperature is generally called pyroelectricity. The polarization of a dielectric substance includes not only macroscopic dipole polarization, but also macroscopic polarization due to space charges which include the charges on the dielectric substance and the charges on the electrodes connected to the dielectric substance and form a pair of positive and negative charges in a macroscopic scale. A ferroelectric substance having spontaneous polarization shows a remarkably reversible pyroelectricity at about the Curie temperature of the substance. Furthermore, an electret composed of a polymer such as methacrylic resin, trifluorochloroethylene, etc., shows also such a pyroelectricity.

An electret is generally prepared by subjecting a dielectric substance to a so-called electret-forming treatment or a poling treatment, that is, by treating the dielectric substance in an intense electric field it will possess permanent or semi-permanent polarization after removing the electric field. In this case, there is a type of electret which forms an electric field outside and a type of electret which forms no electric field outside but keeps polarization inside thereof. In a narrow sense, only the former type is usually called an electret but as the case may be, all the polarized substances including the latter type are called electret in a broad sense. The term "electret" in the specification of the present invention means the electret in the broad sense.

In general, an electret loses its outer electric field caused by the adsorption of various ions on its surface and by the presence of a weak conductivity of the dielectric substance.

It is possible to detect the variation of temperature by utilizing the pyroelectricity of the electret in a form of an electric current or an electric potential and a so-called pyroelectric element wherein such a pyroelectricity is utilized for a heat-electric convertor can be used for detecting infrared rays and so can be employed in the fields of thermography, automatic control, etc. and further as a light-receiving element, etc.

However, for such purposes ferroelectric substances have hitherto been used and the polymer electrets as mentioned above have not yet been used. This reason is that a conventional polymer electret loses gradually its pyroelectricity as a temperature up and down cycle is repeatedly applied thereto to change the sensitivity of the pyroelectric element and also the pyroelectric current is not substantially obtained in the electret after the macroscopic polarization due to space charges are depolarized, which makes it difficult, at any rate, to practically use such a polymer electret as the pyroelectric element.

The inventors have discovered that a polymer electret composed of a vinylidene fluoride resin film having a stable pyroelectricity as a pyroelectric element is obtained by depolarizing most of the macroscopic polarization due to space charges.

Vinylidene fluoride resins are mainly classified into an α-type crystal structure or a helical type structure wherein the polymer chain is in a conformation of TGTG' and a β-type crystal structure or a zig-zag plane structure. The electric potential of the electret composed of the vinylidene fluoride resin having the β-type crystal structure is reduced a few days after the application of the electret-forming treatment to such extent that it is not detected by a rotating sector type potentiometer. That is believed to be caused mainly by the phenomena that the electret of the vinylidene fluoride resin film catches the ions in air to neutralize the charges thereon and the charges in the electret transfer by the conductivity of the substance. That is, the electret of the β-type crystal structure hardly shows the property as the electret in the narrow sense as mentioned above. However, the electret of this type shows a quite high piezoelectricity and pyroelectricity as compared with those of other polymer electrets.

Also, the surface charges of an electret of a vinylidene fluoride resin are greatly reduced by heat treating the electret in such a state that the opposite surfaces thereof are short-circuited. The depolarization of the electret in this case is believed to mainly be the depolarization of the space charges of the electret.

The mechanism why the pyroelectricity sufficient for a pyroelectric element is present even after most of the polarization formed by the space charges in the electret of such a vinylidene fluoride resin has been depolarized has not yet been cleared and such a fact is quite unexpected.

The pyroelectric element of this invention having a stable pyroelectricity is prepared by depolarizing most of the macroscopic polarization by the space charges in the electret of a vinylidene fluoride resin film showing the pyroelectricity.

According to our experiments it has been found that by removing the whole space charges on the electret of the vinylidene fluoride resin the pyroelectric current is stable even at a temperature near the melting point of the resin and can be detected by measurement, but in such case the pyroelectric current is very weak. However, it has also been found that in the case of removing the space charges capable of being depolarized at a temperature of lower than the melting point of the resin, a large pyroelectric current is stable to the temperature variation in a temperature range lower than the heat treatment temperature. At the heat treatment temperature higher than the poling temperature most of the space charges are removed.

The macroscopic polarization formed by the space charges may be depolarized by, for example, short-circuiting the opposite surfaces of the electret composed of a vinylidene fluoride resin film and setting the pyroelectric element for a long time at a temperature higher than the temperature of use and lower slightly then the melting point of the resin or by maintaining the pyroelectric element prepared by short-circuiting its opposite surfaces at a normal temperature for a long time in case of using the pyroelectric element at about normal temperature.

The term "vinylidene fluoride resin" in this specification means not only the homopolymer of vinylidene fluoride but also a copolymer mainly composed of vinylidene fluoride, preferably of more than 60% by weight vinylidene fluoride and other monomer copolymerizable with it. Examples of the copolymerizable monomers include tetrafluoroethylene, trifluoroethylene, hexafluoropropylene, trifluorochloroethylene, fluorochlorovinylidene, vinyl fluoride, and the like.

Also, the term "stable pyroelectricity" in this specification means such a pyroelectricity showing a good reversible reproducibility to the variation of temperature.

As mentioned above, there are mainly the α-type structure and the β-type structure in the vinylidene fluoride resins and the electret of the vinylidene fluoride resin of the β-type crystal structure has a stable and high pyroelectricity.

Figure 1:
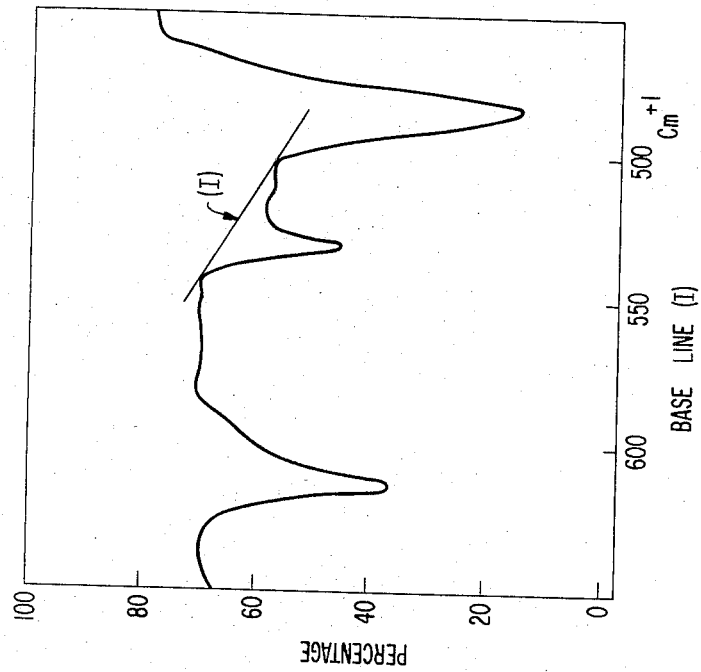

Whether a vinylidene fluoride film has the β-type crystal structure or not can be easily confirmed by its infrared absorption spectra. For example, in the absorption spectra in the KBr region, the absorptions appearing near 530 cm.$^{-1}$ and 510 cm.$^{-1}$ are the crystal bands of the α-type crystal structure and the β-type crystal structure, respectively, and the ratio of the extinction exponents $D_{530}/D_{510}$ is a good index. That is, as the ratio $D_{530}/D_{510}$ is smaller or the electret made of the vinylidene fluoride resin contains a larger proportion of the β-type crystal structure, the electret is better as the pyroelectric element. In this case, the base line is the tangent (I) contacting the feet of the two curves including 530 cm.$^{-1}$ and 510 cm.$^{-1}$, respectively, as shown in FIG. 1 of the accompanying drawings, which shows the base line in the case of obtaining the ratio of the extinction exponents $D_{530}/D_{510}$ of the crystal bands of the α-type crystal structure and the β-type crystal structure. For example, if the ratio $D_{530}/D_{510}$ is about 2.5, the pyroelectricity is as high as that of lithium niobate. But, if the ratio is higher than 4.0, the electret does not show high pyroelectricity.

The vinylidene fluoride resin article having the β-type crystal structure can be prepared by a known method or the knowledge discovered by the inventors. For example, when a vinylidene fluoride resin is subjected to a melt molding, sheet or the film of the resin is obtained having the α-type crystal structure but when a molten vinylidene fluoride resin sheet or film is stretched mono-axially or bi-axially, a vinylidene fluoride resin sheet or film is obtained having a large proportion of the β-type crystal structure. In this case, the proportion of the β-type crystal structure can be increased as the stretching temperature is lower and the stretching percentage is larger.

As other method of obtaining the β-type crystal structure, a casting method may be employed for forming the film of the vinylidene fluoride resin. For example, the vinylidene fluoride resin film of the β-type structure can be formed by casting a solution of the vinylidene fluoride resin in a solvent such as dimethyl acetamide, dimethyl formamide, dimethyl sulfoxide, etc., prepared by dissolving the resin in the solvent at a temperature higher than the crystal melting point (Tm) of the resin and then removing the solvent by heating or pressure reduction.

Moreover, in some cases, a vinylidene fluoride resin film having the β-type crystal structure is obtained regardless of the molding conditions for the film when some kind of the copolymer of vinylidene fluoride and a monomer copolymerizable with it is employed. For example, in the copolymer of vinylident fluoride and tetrafluoroethylene or vinyl fluoride, the proportion of the β-type crystal structure is increased as the content of vinylidene fluoride is reduced in the case where in the feed the amount of vinylidene fluoride is less than 85% by weight and the whole copolymer becomes a complete β-type crystal structure in the case where the content of the vinylidene fluoride is less than 80% by weight.

The vinylidene fluoride resin film having the β-type crystal structure prepared by the manner as described above has a low pyroelectricity. But the highly sensitive pyroelectricity can be provided to the film by subjecting the resin film to the electret-forming treatment or poling treatment.

The electret of the vinylidene fluoride resin film is produced by an ordinary manner, for example, by applying electrodes to the opposite surfaces of the film, placing the assembly in a D.C. high electric field at a temperature higher than room temperature for a proper period of time, and then reducing the temperature to room temperature while applying the electric field. The electrodes may be formed closely intimately on the surfaces of the film, e.g., by means of vacuum plating, etc., or may be disposed near the surfaces of the film with a proper interval therefrom. The electric field applied to the assembly is best as close as possible to the dielectric breakdown voltage of the film. The period of time for the application of the electric field in order to form the polarization in the resin film may be sufficient if the temperature is increased to the desired value within the period but the period is preferably as long as possible in order to obtain sufficient polarization. The temperature of the film to be heated during the application of the electric field may be from room temperature to about the melting point of the resin. The electret of the vinylidene fluoride resin may be prepared after forming the film of the resin or during the formation of the film or further may be prepared by the combination of the above both methods.

The electrodes to be applied to the electret of the vinylidene fluoride-resin film may be metallic plates formed by vacuum plating or may be electrodes placed in an infrared detector and in the case of utilizing the pyroelectric element as a light-receiving element, the electrode on the light-receiving surface is a transparent one.

As mentioned above, the pyroelectricity of the vinylidene fluoride electret is sufficiently high after depolarizing the macroscopic polarization formed by the space charges and furthermore, because the pyroelectric element of this invention is made of a polymer, thin and elastic films or pipes having a desired dimension and a thickness of about 3 microns may be easily prepared, different from the case of employing inorganic compounds, which provides many industrial uses of the pyroelectric element of this invention and provides also its various applications.

Now, the invention will further be explained more practically by the following examples, but the invention shall not be limited to them.

EXAMPLE 1

Circular copper electrodes each having a diameter of 6 cm. were formed by vacuum plating on the opposite surfaces of a mono-axially stretched film of polyvinylidene floride having a thickness of 50 microns and ratio $D_{530}/D_{510}$ of 1.84 and a high D.C. potential of 400 kv./cm. was applied to the film for 30 minutes at 90° C. Then, the temperature of the film was reduced to room temperature while applying the electric potential to the electret of the polymer film. When the surface potentials (opposite surfaces) of the electret were measured directly after the preparation thereof by means of a rotating sector type potentiometer, the potential of one surface was about 200 volts and that of the other surface was about −200 volts.

After short-circuiting the opposite surfaces of the electret film, it was heat-treated in air for one hour at 80° C. When the surface potentials on the opposite surfaces of the electret thus heat treated were measured before the measurement of the pyroelectricity, it showed the monopole potential of about −15 volts. The rate of temperature increase at the measurement of the pyroelectric current was 0.7° C./min. That is, the temperature up and down cycle from the room temperature to 80° C. was repeated ten times at the above taye and the pyroelectric currents during the temperature up and down cycle was measured. As the result, a stable pyroelectric current curve was obtained as shown in FIG. 2 of the accompanying drawing each time, which showed that the results coincided with in a range of measurement error. In addition, the comparison results of the same pyroelectric current measurement about the same electret which was not, however, subjected to the above-mentioned heat treatment are shown in FIG. 3, which showed that the pyroelectric current decreased with each measurement and showed also no stationary relation between the temperature and the current.

EXAMPLE 2

A copolymer of 80 parts by weight of vinylidene fluoride and 20 parts by weight of tetrafluoroethylene was dissolved in acetone in a concentration of 2%. The solution was casted on a glass plate having rims to provide a film at normal temperature and normal pressure. The film on the glass plate was heated to 100° C. for one hour to remove the solvent. The thickness of the film of the copolymer thus formed was about 20 microns. After forming silver electrodes on the opposite surfaces of the film by vacuum plating the film assembly was heated to 90° C. for 30 minutes in a high D.C. electric field of 1400 kv./cm. and then it was cooled to room temperature while applying the electric field to an electret. After short circuiting the opposite surfaces of the electret film, it was heat-treated for one hour at 100° C. When the pyroelectricity of the electret was measured from 18° C. to 60° C., the pyroelectric coefficient of about $1 \times 10^{-9}$ coul./° C. -cm.$^2$ was obtained at 50° C. Also, it was confirmed that the pyroelectric current was stable to the increase or decrease of temperature.

EXAMPLE 3

Copper electrodes were formed on the surfaces of a mono-axially stretched film of polyvinylidene fluoride having a thickness of 50 microns in the same way as in Example 1. The film assembly was heated to 90° C. for 30 minutes in a high D.C. electric field of 1200 kv./cm. and then it was cooled to room temperature while applying the electric field to an electret. After short circuiting the opposite surfaces of the electret film, it was heat treated at 80° C. for one hour in air. The surface potentials of the electret immediately after the preparation were ±250 volts and, they became about −16 volts after the heat treatment. While repeating the temperature up and down cycle of from room temperature to 50° C. ten times at a rate of temperature increase or decrease of 0.7° C./min., the pyroelectric current was measured. By the experiment, a larger pyroelectric current than in Example 1 was obtained, and a pyroelectric coefficient of $6.4 \times 10^{-10}$ coul./° C.-cm.$^2$ was obtained at 25° C. with a good reproducibility.

EXAMPLE 4

A copolymer of 85 parts by weight of vinylidene fluoride and 15 parts by weight of trifluoroethylene was roll-pressed to provide a film and the film was stretched to four times. Copper electrodes were formed by vacuum plating as in Example 1. The film assembly was heated to 90° C. for 30 minutes in a high D.C. electric field of 400 kv./cm. and then the film was cooled to room temperature while applying the electric field to an electret. The electret film thus obtained was heat treated in air for 30 minutes at 90° C. Thereafter, while repeating the temperature up and down cycle between room temperature and 80° C. ten times at a rate of temperature increase or decrease of 1° C./min., the pyroelectric current was measured. By the experiment, a pyroelectric coefficient of $5.1 \times 10^{-10}$ coul./° C.-cm.$^2$ was obtained with a good reproducibility at 25° C.

EXAMPLE 5

Electrodes were formed on a bi-axially stretched film of polyvinylidene fluoride having a thickness of 10 microns in the same manner as in Example 1. The film was heated to 90° C. for 30 minutes in a high D.C. electric field of 400 kv./cm. and then was cooled to room temperature while applying the electric field to an electret. The opposite surfaces of the electret film were short-circuited by wrapping the assembly with an aluminum foil and then the assembly was heat treated for one hour at 70° C. Then, while repeating ten times the temperature up and down cycle of the electret between room temperature and 100° C. the pyroelectric current of the electret was measured. The results are shown in FIG. 4, which showed a stable pyroelectricity was obtained with a good reproducibility in a range of measurement error.

EXAMPLE 6

Copper electrodes were formed on the surfaces of a mono-axially stretched film of polyvinylidene fluoride having a thickness of 50 microns by vacuum plating as in Example 1. The film assembly was heated to 90° C. for 30 minutes in a high D.C. electric field of 400 kv./cm. and then cooled to room temperature while applying the electric field to provide an electret. After short circuiting the surfaces of the electret film, the film was pyroelectric and allowed to stand for 6 months at room temperature whereafter, the pyroelectric current was measured. The results show that a stable pyroelectric current was obtained with a good reproducibility as in Example 1.

What is claimed is:

1. In a process for preparing an electret pyroelectric element wherein a polyvinylidene fluoride resin film of a thickness of less than 50 microns and characterized by an infrared extinction exponents ratio of $D_{530}/D_{510}$ of less than 4.0 is subjected to a D.C. electric field at a temperature above room temperature and cooled while in said field to produce a polyvinylidene fluoride resin electret, the improvement comprising, to stabilize the pyroelectric characteristics of the electret, short circuiting the opposite surfaces of the electret following preparation and then subjecting the electret to a temperature between the melting temperature of the polyvinylidene fluoride resin and the temperature at which the pyroelectric element is used and for a time sufficient to obtain pyroelectric stability.

2. The process of Claim 1 wherein the polyvinylidene fluoride resin film is a mono-axially stretched film.

3. The process of Claim 1 wherein the polyvinylidene fluoride resin film is a bi-axially stretched film.

4. The process of Claim 1 wherein the polyvinylidene fluoride resin film is a solution cast resin film.

5. The process of Claim 1 wherein the polyvinylidene fluoride is a homopolymer of vinylidene fluoride.

6. The process of Claim 1 wherein the polyvinylidene fluoride resin is a copolymer of vinylidene fluoride and a monomer copolymerizable with said vinylidene fluoride, the vinylidene fluoride forming at least 50% of said polymer.

7. The product produced by the process of Claim 1.

References Cited

FOREIGN PATENTS 1,218,730   1/1971   Great Britain _____ 252—63.5

JOHN D. WELSH, Primary Examiner

U.S. Cl. X.R.

252—63.2; 317—258